(12) United States Patent
Ng

(10) Patent No.: US 7,404,203 B2
(45) Date of Patent: Jul. 22, 2008

(54) DISTRIBUTED CAPABILITY-BASED AUTHORIZATION ARCHITECTURE

(75) Inventor: Raymond K. Ng, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 818 days.

(21) Appl. No.: 10/430,967

(22) Filed: May 6, 2003

(65) Prior Publication Data

US 2004/0225896 A1 Nov. 11, 2004

(51) Int. Cl.
*G06F 11/30* (2006.01)
(52) U.S. Cl. .................. 726/6; 726/2; 726/3; 726/4; 726/5; 726/1; 713/170; 713/165; 713/166; 713/167
(58) Field of Classification Search ........... 713/155, 713/165–170, 1, 2, 4, 12, 28, 27, 29; 726/1–6, 726/12, 28–29
See application file for complete search history.

(56) References Cited

U.S. PATENT DOCUMENTS

| | | | | |
|---|---|---|---|---|
| 5,815,665 | A * | 9/1998 | Teper et al. ................. 709/229 |
| 6,938,158 | B2 * | 8/2005 | Azuma ....................... 713/182 |
| 7,036,142 | B1 * | 4/2006 | Zhang et al. .................. 726/12 |
| 7,039,804 | B2 * | 5/2006 | Fichtner et al. ............. 713/169 |
| 7,069,437 | B2 * | 6/2006 | Williams ..................... 713/166 |
| 7,076,784 | B1 * | 7/2006 | Russell et al. ............... 719/315 |
| 7,131,000 | B2 * | 10/2006 | Bradee ....................... 713/164 |
| 7,133,907 | B2 * | 11/2006 | Carlson et al. .............. 709/220 |
| 7,139,999 | B2 * | 11/2006 | Bowman-Amuah ......... 717/101 |
| 7,167,844 | B1 * | 1/2007 | Leong et al. .................. 705/80 |
| 7,185,047 | B1 * | 2/2007 | Bate et al. ................... 709/202 |
| 2004/0015723 | A1 * | 1/2004 | Pham et al. ................. 713/201 |

OTHER PUBLICATIONS

RBAC '99, Proceedings of the Fourth ACM Workshop on Role-Based Access Control, Oct. 28-29, 1999, Fairfax, VA, USA. ACM 1999.☐☐.*
Thomas, R. "Role-Based Access Control and Distributed Object-Based Enterprise Computing", 1996, Association for Computing Machinery, ACM RBAC Workshop, MD, USA., pp. II-99-II-102.*
Freudenthal et al., "dRBAC: Distributed Role-based Access Control for Dynamic Coalition Environments", 2002, Proceedings of the 22nd International Conference on Distributed Computing Systems. (ICDCS'02).*

(Continued)

*Primary Examiner*—Kambiz Zand
*Assistant Examiner*—Tongoc Tran
(74) *Attorney, Agent, or Firm*—Park, Vaughan & Fleming LLP

(57) ABSTRACT

A system and methods for applying capability-based authorization within a distributed computing environment. Instead of associating permissions or privileges with objects (e.g., computing resources), permissions are associated with subjects (e.g., users, roles). Compared to object-based methods of access control, such as Access Control Lists (ACL), management of capability-based authorizations scales much better as the number of objects becomes very large. A central repository allows changes to the authorization framework (e.g., new subjects, modified permissions) to be made once. The changes can then be propagated across, and applied to, multiple address spaces instead of having to individually or manually update each local node or address space.

25 Claims, 5 Drawing Sheets

OTHER PUBLICATIONS

Giuri et al., Role-Based Access Control on the Web Using Java:, 1999, ACM, pp. 11-18.*

Hilmann et al., "Managing Trust between Collaborating Companies using outsourced Role-Based Access Control", 1999, ACM, pp. 105-130.*

Linn et al., "Attributes Certification: An Enabling Technology for Delegation and Role-Based Controls in Distributed Environment", 1999, ACM, pp. 121-130.*

* cited by examiner

Role Hierarchy 100

DISTRIBUTED CAPABILITY-BASED AUTHORIZATION ARCHITECTURE

BACKGROUND

This invention relates generally to the fields of computer systems and access authorization. More particularly, a system and method are provided for implementing a distributed capability-based authorization architecture.

Organizations and enterprises implement some form of access control or authorization in their computing environments in order to protect their resources from damage and/or unauthorized use. An authorization scheme is usually intended to ensure that only authorized users are granted access to the organization's computing resources.

Traditional authorization schemes employ an ACL (Access Control List) model, in which an ACL is associated with each resource (e.g., file, directory, disk, communication device, programming object) to which access is to be restricted. An ACL is designed to identify, for a specific resource, those users that are permitted access to the resource.

One disadvantage of the ACL model is the difficulty of managing ACLs for many resources. Typically, one ACL is needed for each resource to which access is to be screened. Therefore, this model does not scale well, because every time such a resource is created or added to the computing environment, another ACL must be generated. In addition, maintaining ACLs can be time-consuming, because they may need to be updated every time a new user is added, an existing user departs, a user's permission to use a resource is changed, a user's identity changes, etc.

In contrast, in a capability-based authorization scheme, access authorization information would be associated with subjects (e.g., users, roles) rather than objects (e.g., resources) to which the subjects desire access. Thus, a capability-based authorization scheme could avoid some or all of the difficulties associated managing ACLs.

Previous attempts to provide capability-based authorization schemes have been unsatisfactory, in part because they have limited scope. More specifically, attempted schemes are limited to implementation within one address space, associated with one JVM (Java Virtual Machine) for example. Thus, in a Java environment, within each address space, a separate authorization scheme would have to be implemented and maintained. There would be little, if any, ability to share authorization information across address spaces and each scheme would have to be updated separately.

Also, many authorization schemes only allow access privileges to be granted to users. This typically requires every user's authorization profile to be individually configured—every user is granted his or her necessary authorizations. Even if multiple users have the same access requirements, they would each have to be configured separately.

Thus, beyond the difficulties of managing authorization privileges or permissions as the number of objects and/or subjects increase, it can be difficult to manage how those privileges or permissions are granted. In particular, it can take a significant portion of a security administrator's time to grant, revoke and alter the access privileges of subjects (e.g., users) within an organization's computing environment, as subjects come and go and as the configuration of the environment changes (e.g., as resources are added or removed). This is because typical security policies (e.g., the default policy for the Java programming language) do not include administrative functionality for managing access privileges. As a result, it is not possible to control, with fine granularity, which subjects can make changes to the security policy, and what kind of changes they can make.

SUMMARY

In one embodiment of the invention, a system and methods are provided for applying capability-based authorization within a distributed computing environment. Instead of associating permissions or privileges with objects (e.g., computing resources), permissions are associated with subjects (e.g., users, roles).

Compared to object-based methods of access control, such as Access Control Lists (ACL), management of capability-based authorizations scales much better as the number of objects becomes very large. A central repository allows changes to the authorization framework (e.g., new subjects, modified permissions) to be made once. The changes can then be propagated across multiple address spaces instead of having to individually or manually update each local node or address space.

DETAILED DESCRIPTION

Figure 1:
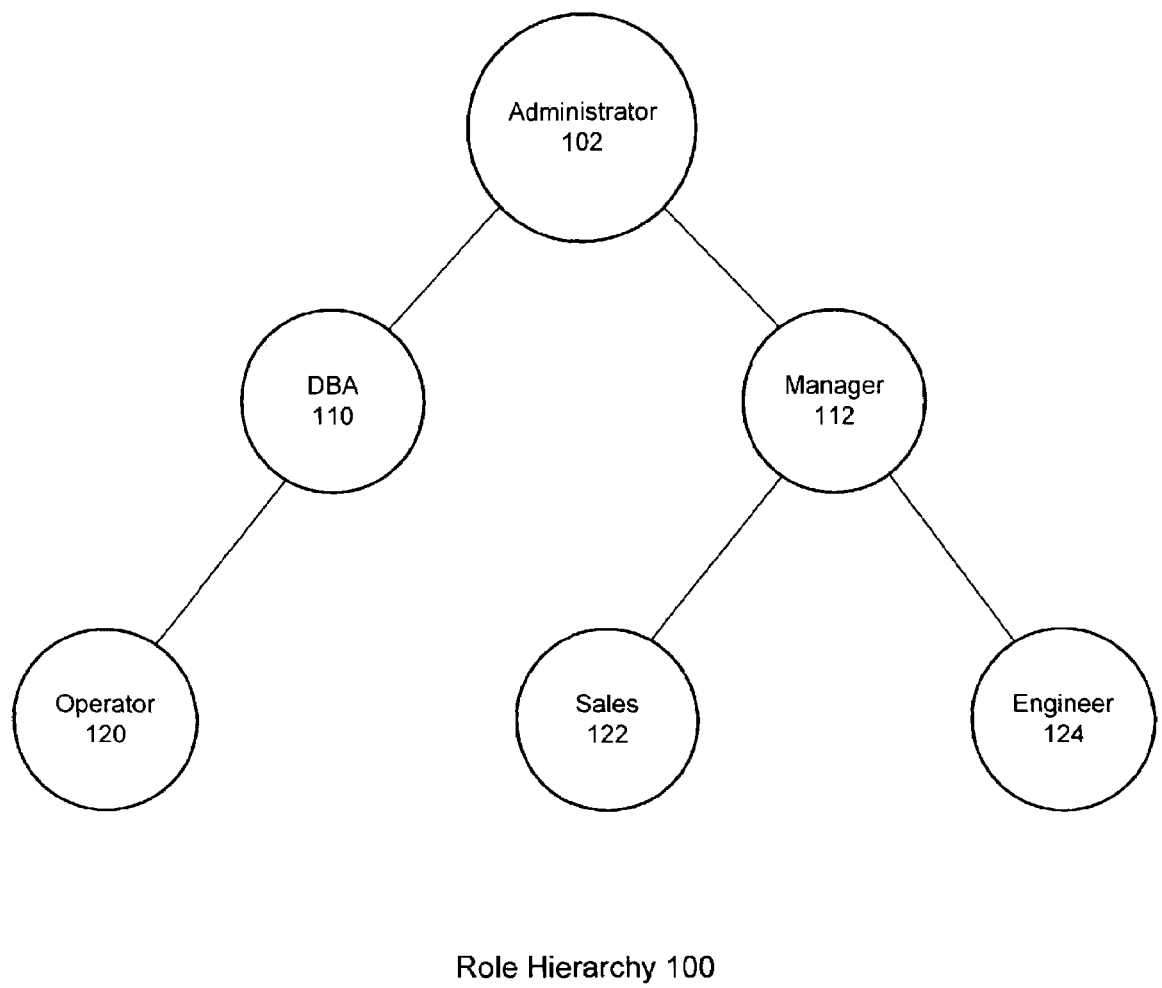
FIG. 1 is a diagram of a hierarchical role graph for use within an authorization architecture, according to one embodiment of the invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

Introduction

In one embodiment of the invention, a system and method are provided for implementing a distributed, capability-based, authorization architecture for controlling access to objects, services and/or other resources of an organization's computing environment (e.g., physical devices, logical devices, programming objects). In a capability-based authorization architecture, privileges or permissions to access objects or resources are associated with subjects (e.g. users) that use the resources, rather than with the resources themselves. Because the architecture is distributed, it is able to cover an entire organization's computing environment, and is not limited to one address space (e.g., the address space associated with one Java process operating on one local node of a network). An embodiment of the invention may be implemented as part of a directory server or as part of a database management system, such as Oracle® by Oracle Corporation (e.g., Oracle9i™ Application Server).

In this embodiment, a centrally administered repository facilitates management of the distributed capability-based authorization architecture. Illustratively, this repository may comprise an Oracle Internet Directory. The architecture provides a single security model for J2SE (Java 2 Standard Edition) and J2EE (Java 2 Enterprise Edition) applications that is easily scalable and provides high performance. Using this architecture, a J2EE platform can be integrated with JAAS (Java Authentication and Authorization Service) or some other security platform to provide a monolithic security structure.

In another embodiment of the invention, subjects (to which permissions or privileges to access objects are granted) include roles, in addition to or instead of individual users. Users (and/or other entities that require access to computing resources) are given membership in various roles to allow them to access objects. For example, a role such as "Employee" or "Manager" may embody read and write, but not delete, privileges over one or more specific objects. A different role may embody different permissions or privileges to manipulate the same object(s).

Thus, a permission or privilege may be granted directly to a user, or may be granted to a role to which users can be assigned. In these embodiments, privilege information is associated with subjects (e.g., users, roles) rather than objects (e.g., resources). Because the number of objects may be much greater than the number of subjects in a computing environment, a distributed capability-based authorization architecture based on subjects will generally be easier to manage than an object-based authorization scheme (e.g., using ACLs).

In another embodiment of the invention, a system and method are provided for managing the administration of a security policy within an organization. More specifically, the ability to manage permissions (e.g., to grant, revoke or alter access to a resource) may be embodied as another privilege (e.g., an Admin or meta-level privilege). That privilege may then be granted to subjects according to the organization's security policy. For example, each subject that owns a set of resources (e.g., a home directory) may be granted an Admin privilege allowing that subject to grant other subjects access to those resources.

Role-Based Access Control in an Object-Oriented Programming Environment

In one embodiment of the invention, privileges and permissions to access objects (e.g., computing resources) are granted to roles, instead of or in addition to granting privileges directly to users. Subjects (e.g., users, programming objects that need access to resources) are then assigned membership in those roles. A role may be descriptive of a user's duties or position (e.g., Employee, Manager, Engineer, Administrator) or may be generic (e.g., Role1, RoleX, ABC).

Thus, a role can be used to group and identify users requiring similar or identical access to computing resources, and corresponding privileges may then be assigned. Each permission or privilege may specify that the holder(s) is/are authorized to perform specific operations (e.g., read, write, delete, create) on any number of objects. Individual objects may be identified specifically (e.g., by full pathname, process id), and groups of objects may be identified in any suitable manner (e.g., by folder or directory, partial name, address space, class name, with wildcards).

Unlike ACLs, the management of role-based permissions is readily scalable for large numbers of subjects and objects. New users merely need to be added to appropriate roles, departing users are removed from their roles, and users can be easily moved between roles as their access needs change. New roles may be created as necessary. And, whereas with ACLs an ACL for every object that a subject wishes to access must be examined to determine if access can be granted, with role-based access control an access control context established for the subject (e.g., when he or she logged in) identifies the permissions and privileges the subject has (e.g., permissions granted directly to the subject and/or to roles in which the subject is a member).

In one embodiment of the invention, roles are implemented in the JAAS or Java 2 permission model. In particular, in a Java programming environment, JAAS may be replaced by an authorization service that is based on JAAS or the Java 2 permission model, but which supports role-based access control. If implemented in a distributed environment, implementation of the role-based access control allows the authorization service to remain readily manageable as it scales to accommodate many objects and subjects.

One skilled in the art will appreciate that the standard implementation of JAAS provides for the granting of privileges or permissions to principals, but provided little more. In the presently described embodiment of the invention, an authorization service provides the ability to define "realms" and, within a realm, to create users and roles. A realm may be defined as a unique namespace having any desired scope or boundary (e.g., an organization, a department, a geographical site), comparable to a network domain.

Within a realm, any number of users and roles may be defined, and a user may be assigned to any or all of the roles. Further, privileges may be granted not only to individual roles (e.g., Employee, Manager), but also to combinations of roles. Thus, Privilege1 may be granted to RoleX by the following: "Grant RoleX Privilege1." The same privilege may be granted to multiple roles in one statement: "Grant RoleX, RoleY Privilege1." Further, a privilege may be granted only to subjects holding specific combinations of roles. For example, to grant Privilege1 only to users who are members of both RoleX and RoleY, the following grant statement may be applied: "Grant ((RoleX ˆ RoleY ) Privilege1."

Illustratively, an implementation of this embodiment may be applied to Oracle Corporation's OC4J (Oracle Containers for J2EE). Thus, an enterprise's entire security framework, including multiple address spaces, may receive the benefit of role-based access control.

A permission model in this embodiment of the invention may include any number of roles. Additionally, some or all of the roles may be arranged in a hierarchy, thereby allowing role membership to be inherited. FIG. 1 demonstrates a role hierarchy according to one embodiment of the invention.

In FIG. 1, role hierarchy 100 is rooted at Administrator 102. Members of the Administrator role may be considered to have all defined privileges and permissions or, alternatively, all privileges and permissions of the roles descending from Administrator 102.

Similarly, members of the DBA role (node 110) possess the permissions granted to members of the Operator role (node 120). And, the permissions or privileges assigned to the Sales role (node 122) and Engineer role (node 124) are also available to members of the Manager role (node 112).

Thus, members of any given role may also be considered members of any roles descending from that role. For example, each member of the Manager role may be considered a member of the Sales and/or Engineer roles as well. Each realm or domain may include any number of role hierarchies.

In an embodiment of the invention, an access control context is established for a user, or other subject, when that subject is authenticated or first attempts to access an object. In this embodiment, a subject's access control context identifies the roles of which the subject is a member, plus any private credentials and public credentials he may have. A local node may cache some or all roles (e.g., part or all of a role hierarchy graph), as well as information indicating which permissions have been granted to those roles, while each subject's access control context identifies the specific roles held by that subject.

A subject's private credentials may include his password, a private encryption key, etc. Public credentials may include other information for identifying or verifying the subject's identity, such as a public key, an electronic mail address, etc.

Illustratively, and as described in a following section, a central repository—that may be accessible throughout a distributed computing environment (e.g., across namespaces)—may be established to centrally manage authorization policies throughout the environment. Thus, the central repository may store information concerning some or all roles, subjects and privileges in one or more realms.

A Distributed Capability-Based Authorization Architecture

In one embodiment of the invention, a capability-based authorization architecture is extended to an entire J2EE distributed object space (e.g., spanning multiple processes and address spaces). Within this distributed space may be virtually any number of objects or resources to which any number of subjects (e.g., users, roles) may need access. The objects may include physical devices, logical devices, files and directories, database tables, JSPs (Java Server Pages), EJBs (Enterprise Java Beans) and/or other web service and business server programming components. These objects may be distributed among multiple Java address spaces. Thus, they may exist on different computing platforms or machines and/or in different processes.

In this embodiment, a directory server such as Oracle Internet Directory (OID) is employed to provide a central repository for administering security policies for all the subjects. A policy comprises a set of authorization rules, including grants of certain privileges or permissions to specified subjects. By storing the policies and authorization information in database form in a central location, the information is easily searchable and retrievable from multiple nodes.

In an embodiment of the invention, a user's access control context is established when he logs in or otherwise connects to the system. For example, his roles and privileges may be retrieved as part of the process of establishing a connection or user session. Then, when the subject attempts to access a protected resource, his context includes the information necessary to determine whether the requested access should be granted. Not all of the user's roles/privileges need to be loaded when he connects. They may be retrieved as needed from the central repository or a temporary local repository (e.g., a cache).

Each process or JVM that will use the distributed capability-based authorization architecture includes logic for accessing and manipulating the central repository. For example, each JVM may include code (e.g., enhanced JAAS code) for retrieving a security policy from the central repository and enforcing the policy. Thus, when a user connects to a process (e.g., a web server or application server), a security policy for the user is retrieved from a cache or the central repository. With that policy, a context can be established for the user's session.

Thus, this embodiment of the invention significantly differs from a traditional file-based authorization scheme (whether it uses the ACL model or a limited capability-based model) in which, to change a security policy or authorization, separate files for each address space must be updated. Instead, updates can be made in one central location and disseminated to each address space.

Figure 2:
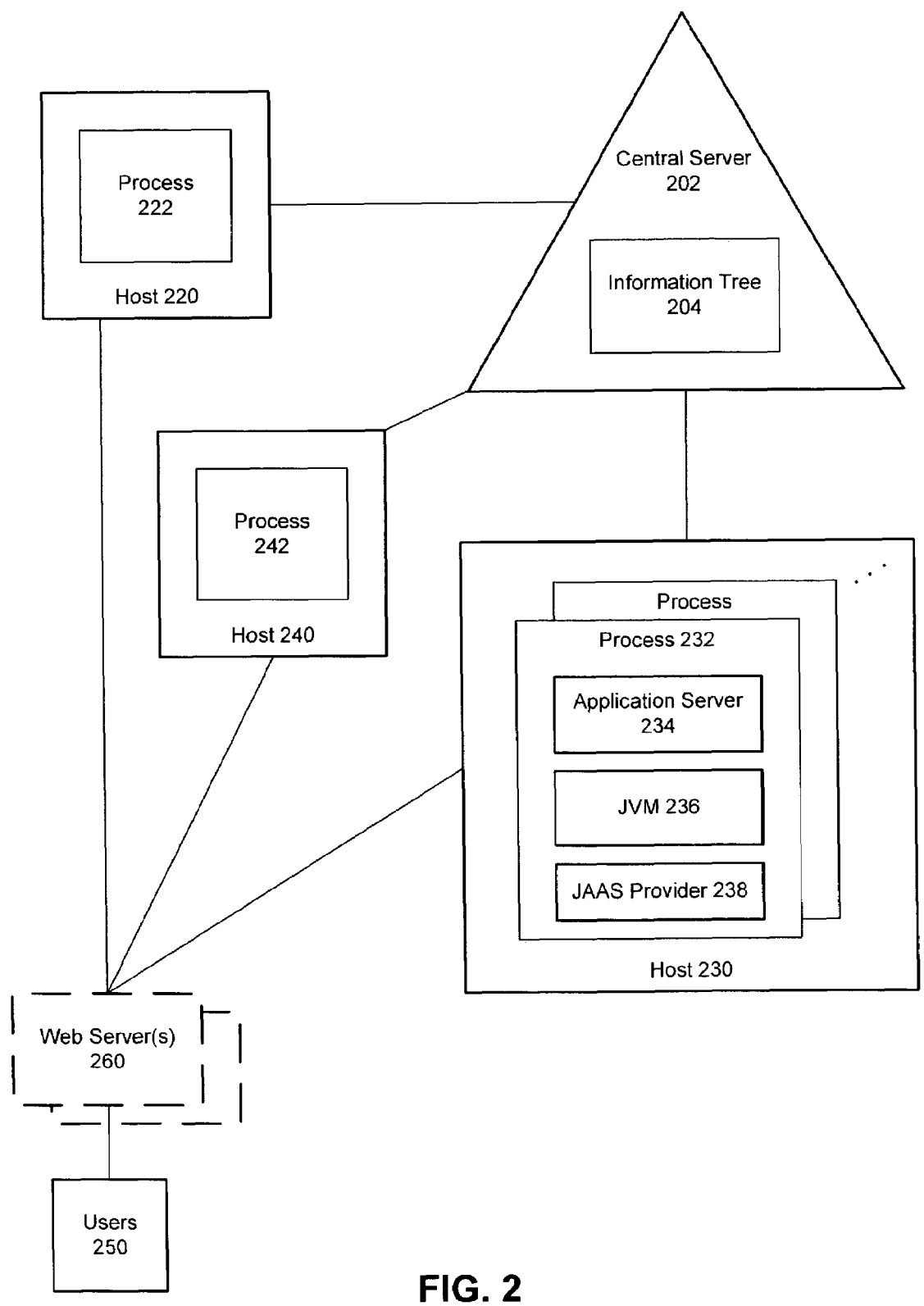
FIG. 2 is a block diagram of a distributed capability-based authorization architecture, according to one embodiment of the present invention.

FIG. 2 is a block diagram of a distributed capability-based authorization architecture, according to one embodiment of the invention. The computing environment of FIG. 2 includes central server 202, one or more hosts (e.g., hosts 220, 230, 240), a plurality of users 250 and an optional intermediate server (e.g., web server) 260.

Central server 202 is configured to provide centralized administration and management of an organization's distributed capability-based authorization architecture. Central server 202 includes information tree 204, which may comprise an Oracle Internet Directory (OID). Information tree 204 stores security policies (e.g., permission grants) for users 250 and/or roles assigned to users 250.

Hosts 220, 230, 240 may include any types of computer systems, and may communicate with central server 202 (and/or each other) via direct or indirect (e.g., network), wired or wireless communication links. Thus, the hosts may be coupled to central server 202 via the organization's local area network, a wide area network or a publicly accessible network such as the Internet.

Web server(s) 260 may comprise an Apache server or other web server configured to facilitate access to hosts 220, 230, 240 by users 250. Users 250 may employ virtually any type of communication or computing device to access a host (e.g., laptop or desktop computer, Personal Digital Assistant (PDA), smart telephone).

Each host, such as host 230, includes any number of processes, such as process 232. In this embodiment, each process includes an application server instance (e.g., application server 234), a Java virtual machine (e.g., JVM 236) and JAAS provider 238 or other code for interfacing with the security policies stored on central server 202.

In process 232 of host 230, application server 234 may include distributed J2EE components, EJBs, Java server pages, etc. JVM 236 hosts any number of Java objects. Process 232 may also include a cache (not shown in FIG. 2) for storing a subset of policies or permission grants from central server 202. Thus, process 232 may cache the authentication and authorization policies of some or all users connected to the process. When a user or other subject requests access to an object or resource, the process (e.g., JAAS provider 238) determines whether the user has the necessary permission, or whether the user has been assigned a role having the necessary permission.

Because the capability-based authorization architecture of FIG. 2 is distributed, no host or process needs to load or maintain security policies other than those needed for current users. When a new user is added to the system, his or her role memberships and/or direct permission grants are created at central server 202, and departing users' permissions are disabled at the central server. Each host and host process need not be separately updated. New permissions will be loaded automatically from the central server, and once the permissions of a departing user are disabled at central server 202, they will not be loaded on a host.

In an embodiment of the invention, permissions of subjects (e.g., users, roles) are stored in a database. This allows them to be more easily searched and retrieved in comparison to the typical flat-file storage format employed in tradition authorization schemes.

By supporting a service provider interface model—e.g., with multiple implementations of the same API—an embodiment of the invention can support various storage formats (e.g., flat-file, centralized directory). This flexibility allows developers to simplify the development and deployment process. For example, a developer could test an application against a local flat-file during development, and then switch to directory-based central storage when the application is deployed to a production site. The developer need not even be concerned with administering the directory-based store; that can be handled by the security administrator at the production site.

Figure 3:
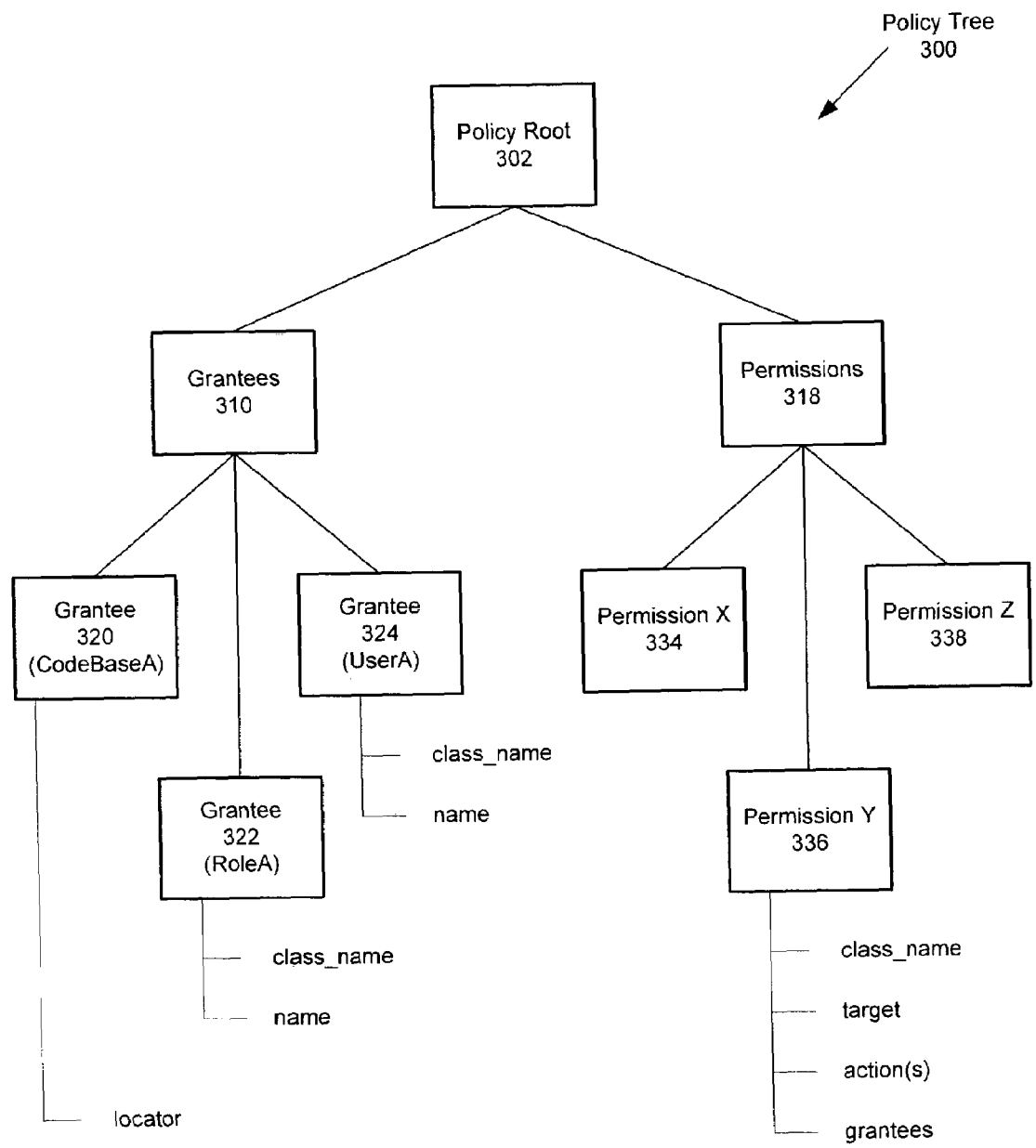
FIG. 3 depicts a policy tree for storing policies for granting access to resources, according to one embodiment of the invention.

FIG. 3 demonstrates a directory structure for associating subjects and the permissions or privileges granted to those subjects, according to one embodiment of the invention.

Policy tree 300 comprises policy root 302, a sub-tree of permission grantees rooted at node 310, and a sub-tree of permissions rooted at node 318. Under grantee node 310 are various grantees (e.g., nodes 320, 322, 324), each of which corresponds to a user, role, codebase (e.g., code block or module) or other grantee of a permission. Each grantee node may have various fields or attributes. Thus, Grantee 320 (CodeBaseA) has a locator attribute (e.g., a URL) to identify the code, and the principals represented by Grantee 322 (RoleA) and Grantee 324 (UserA) include attributes for class_name (e.g., the class used to instantiate the subject) and name.

Under permission node 318 are any number of nodes (e.g., nodes 334, 336, 338), each of which describes a permission or set of permissions that may be granted to a subject.

A permission node, such as node 336, includes attributes describing the permission, as well as a list of grantees to which the permission has been granted. The grantees may include any number of subjects (e.g., users, roles, code objects) (e.g., any of the grantees under grantee node 310). Thus, the permission embodied by node 336 may have a class_name of java.io.FilePermission (i.e., the class from which the permission was instantiated), a target (i.e., the object to which access is to be permitted or restricted) of /tmp/* and actions (i.e., the permitted action(s)) of Read and Write. This FilePermission may be represented as <FilePermission, /tmp/*, "read, write">. Another example of a permission is <SocketPermission, http://jazn:8888, listen>. This grants permission to listen on the specified socket.

In other implementations of the invention, nodes in a policy tree may have virtually any attributes and/or may be cross-referenced. For example, a grantee node that is a role may reference, or be connected to, the members of that role, or vice versa.

When an administrator or system manager grants a permission to a new subject, that subject is added as a grantee under the corresponding permission. New permissions, and new grantees, are defined and added to policy tree 300 as needed.

In an embodiment of the invention in which roles are used, permissions are granted to roles and roles are assigned to users. Permissions may or may not be granted directly to users also. Virtually any number of permissions may be granted to a role (or user) and virtually any number of roles may be granted to a user. In this embodiment, roles may or may not be stored in the same type of directory structure as policy tree 300. Illustratively, in this embodiment, a directory structure for managing the overall capability-based authorization architecture may include separate sub-trees for roles, users and policies.

Figure 4:
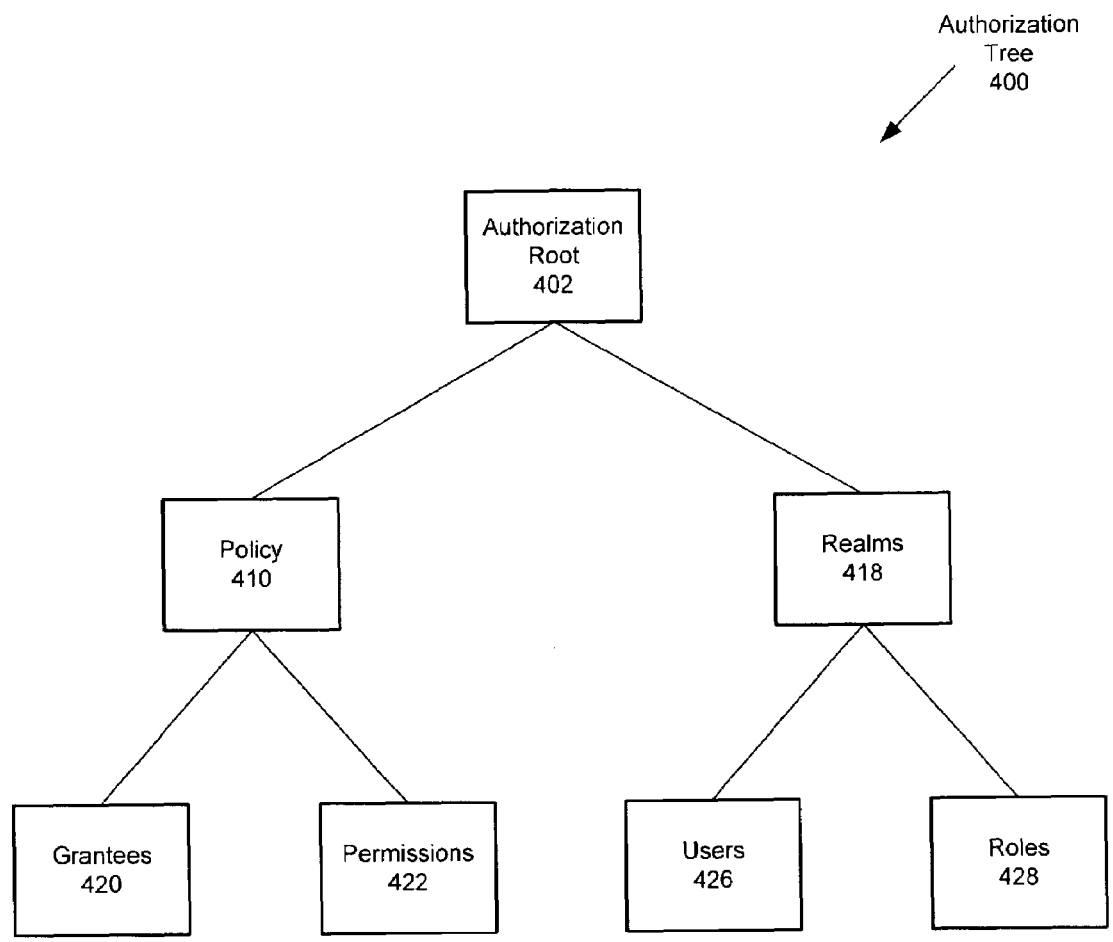
FIG. 4 depicts an authorization tree for managing a distributed capability-based authorization architecture, according to one embodiment of the invention.

FIG. 4 demonstrates a tree or directory structure for managing capability-based authorization information for a distributed computing environment, according to one embodiment of the invention. Authorization tree 400 may be stored at a central repository and any or all of it may be replicated (e.g., cached) at local nodes, as needed.

Authorization tree 400 is rooted at authorization root 402. A policy sub-tree is rooted at node 410, while a realm sub-tree is rooted at node 418. As described above, a policy sub-tree may be configured to associate permissions and grantees (e.g., subjects) that have received the permissions.

In the illustrated embodiment of the invention, a realm sub-tree identifies the realms defined within the distributed environment served by authorization tree 400. Any number of realms may be defined, with each one defining a separate namespace. Each realm established as part of realms node 418 associates corresponding users in that realm (node 426) with roles established within the realm (node 428). Different realms may be defined, for example, for different geographical areas, different organizations or components of an organization, etc.

When determining a user's access rights, the realm sub-tree (node 418) in which the user is active is searched, and the user's roles are learned. Then the policy sub-tree is searched to determine which permissions have been granted to the user and/or his roles.

Several queries may be necessary, depending on the number of roles assigned to the user, to identify all of the user's permissions or privileges. For example, the permissions granted directly to each of the user's roles may be retrieved. Then, additional queries may be made to determine whether any permissions have been granted to specific combinations of the users' roles. It may also be necessary to examine whether any permissions have been granted directly to the user. The union of all the permission queries yields the set of permissions to be enjoyed by the user.

System and Method for Permission Administration Using Meta-Permissions

In one embodiment of the invention, a system and method are provided for managing a permission policy within a capability-based authorization system. More specifically, a system and method are provided for managing subjects' ability to grant, revoke or otherwise modify permissions or privileges to access objects.

In a Java or other object-oriented programming language environment, permissions or privileges for protecting files (e.g., FilePermissions), sockets (e.g., SocketPermissions), databases (e.g., DBPermissions) and/or other objects may be considered "object permissions." An organization may create new object permissions, beyond those provided in a standard Java security policy for standard object types, to meet the access control needs of the organization's computing environment.

An object permission may be represented by a tuple having the general form of <class, target, action>. The class identifies the type of object permission—which may be a class name (e.g., FilePermission, SocketPermission, DBPermission), the target identifies the object(s) to which the permission applies (e.g., a set of files, a set of port numbers, a table name), and the action identifies the action(s) that are permitted regarding the target.

Thus, a Java FilePermission to allow read access to all files in a /tmp directory may be represented as <FilePermission, /tmp/*, read>  (1)

An illustrative SocketPermission may be represented as

<SocketPermission, host: 1000-2000, listen>  (2)

FilePermission (1) may be granted to a subject "S1" with a statement such as grant S1 permission FilePermission, /tmp/*, read In an embodiment of the invention, a meta-level permission, embodying or containing one or more object permissions, is introduced. In particular, a meta-level, or AdminPermission, is a permission to administer one or more object permissions. An AdminPermission may allow a subject full administrative privileges over an object permission, or just one or more specific actions (e.g., to grant or revoke the object permission).

An AdminPermission may be represented by a tuple having the form <AdminPermission, object permission, action>, wherein the object permission field identifies an object permission, possibly in the form of the tuple described above. The action identifies the administrative privilege(s) the recipient of the AdminPermission may exercise.

Thus, an AdminPermission to grant FilePermission (1) above may be similar to the following:

<AdminPermission, <FilePermission, /tmp/*, read>,
    grant>  (3)

This example AdminPermission may be granted to subject S1 with a statement such as grant S1 permission AdminPermission <FilePermission, /tmp/*, read> grant An organization's security policy may provide for the granting of AdminPermissions to subjects to allow them to control access to resources or objects they "own" or maintain. Thus, a user may be granted an AdminPermission allowing her to grant access to her home directory to other subjects. Or, a developer may receive an AdminPermission enabling him to grant access to his code to other members of his development team.

Similar to the manner in which a FilePermission constructor, a SocketPermission constructor and other constructors are used to construct new object permissions, a constructor may be provided to create AdminPermissions. An object permission constructor receives the name of a target and the actions to be permitted, and generates the corresponding permission. An AdminPermission constructor receives the name or an identifier of an object permission and the administrative privilege(s) that are to be permitted, and generates a corresponding AdminPermission.

Further, when a subject attempts to access an object protected by an object permission, a checkPermission method (or other method) is called to compare the subject's privileges to the action being attempted by the subject. An Implies method corresponding to the object permission may also be called (e.g., by checkPermission) to determine whether the subject's object permissions include (i.e., imply) the ability to perform the action.

Thus, the Implies method facilitates the use of wildcards (e.g., the "*" symbol) when identifying objects such as files. If a FilePermission granting the ability to create a file includes a wildcard, then the FilePermission.implies method may be used to determine whether that permission applies to a specific file that a subject attempts to create.

In an embodiment of the invention, an Implies method is provided with the AdminPermission class to help determine whether a particular AdminPermission includes permission for a subject to take a particular administrative action with an object permission (e.g., to grant, revoke or otherwise modify the object permission).

When a subject is granted an AdminPermission regarding an object permission, that subject is able to perform any actions implied by the granted permission. Thus, if subject S1 is granted AdminPermission (3) from above, S1 can grant another subject permission to read a specific file within the /tmp directory (e.g., /tmp/foo).

When S1 attempts to exercise AdminPermission (3), the checkPermission method may call the AdminPermission.implies method to determine if AdminPermission (3) implies the privilege to perform the action that S1 is attempting. Thus, if S1 is attempting to grant subject S2 permission to write to a file in the /tmp directory, or to read a file in a different directory, a security exception will be thrown.

In one embodiment, even before an AdminPermission.implies method is called, a check is made as to whether the subject attempting to administer an object permission has any AdminPermissions. If a user doesn't have any AdminPermissions, then a security exception can be thrown as soon as she attempts to administer the object permission.

Figure 5:
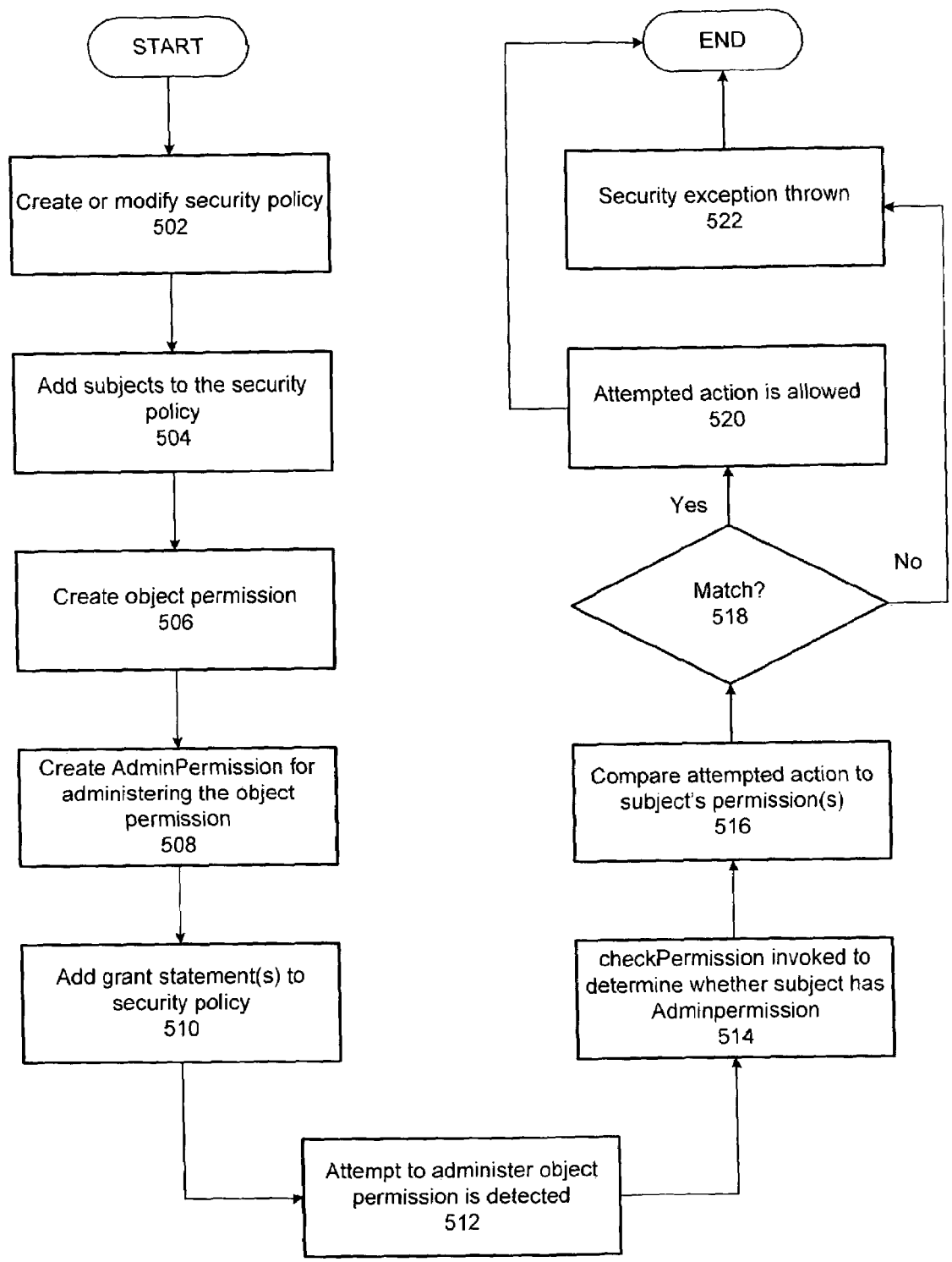
FIG. 5 is a flowchart demonstrating a method of administering an object permission with an AdminPermission, according to one embodiment of the invention.

FIG. 5 demonstrates a method of using AdminPermissions to administer object permissions within an organization's security policy, according to one embodiment of the invention.

In state 502, a security policy is identified or created for use within the organization's computing environment, which may be distributed (e.g., comprise multiple address spaces) or centralized (e.g., within one address space). The security policy may, for example, comprise or be based on the Java Authentication and Authorization service (JAAS) policy.

In state 504, the security policy is populated with users and/or other subjects. For example, users may be enumerated and roles to which the users are assigned may also be identified.

In state 506, an object permission for allowing access to a set of objects is created within the security policy. Illustratively, the object permission may be instantiated from a default Java permission type (e.g., FilePermission, SocketPermission), or a custom (e.g. organization-specific) permission type may be defined and instantiated. The object permission identifies one or more objects to which it applies (e.g., files, sockets, database tables), and one or more actions the permission allows (e.g., read, write, execute, listen, accept, insert, delete).

In state 508, an AdminPermission is created within the security policy. In one embodiment of the invention, an AdminPermission class is defined and added to the computing environment. In another embodiment, an AdminPermission or similar class may be provided as part of the default or base security policy (e.g., JAAS).

In the method depicted in FIG. 5, the AdminPermission instance identifies one or more object permissions (which may or may not yet exist), and one or more actions that the AdminPermission allows to be performed on the object permission(s). Illustrative atomic actions include grant, revoke and modify, or a single action (e.g., administer) may be specified to allow all administration actions (or a subset of all administration actions) to be performed.

In state 510, one or more grant statements are written in the security policy. Within the grant statement(s), the object permission is granted to one or more subjects (e.g., users, roles), and the AdminPermission is granted to the same or different subjects.

In state 512, while an application is operating in the organization's computing environment, an attempt is made by a subject to administer the object permission. For example, a first user (or a user belonging to a first role) may attempt to grant the object permission to a second user.

In state 514, a checkPermission method is invoked to determine whether the subject is permitted to administer the object permission in the manner attempted. The checkPermission method may receive the object permission and the action being attempted.

In state 516, an AdminPermission.implies method may be called to determine whether an AdminPermission held by the subject that attempted to take the action includes permission to take the attempted action.

In state 518, a determination is made as to whether the subject's AdminPermission(s) include the necessary permission. If the subject has a suitable AdminPermission, then the action is allowed in state 520. Otherwise, a security exception is thrown in state 522.

In the illustrated embodiment of the invention, to properly bootstrap the permission-based administrative model, the default security policy is modified to grant appropriate AdminPermissions to the security administrator(s) that administer the policy. For example, the AdminPermissions may be (pre-)granted to an administrative group or role whose members are responsible for administering the policy. These administrators can then delegate administrative responsibilities to other administrators as necessary, by granting the proper AdminPermissions.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of administering access to computing resources distributed among multiple address spaces, the method comprising:

maintaining a central database of capability-based access policies, wherein each said capability-based access policy grants a subject one or more access permissions to a resource, wherein maintaining the central database of capability-based access policies comprises maintaining a logical authorization tree which includes an authorization root, and wherein the logical authorization tree comprises a policy sub-tree and a realm sub-tree; and at each of a plurality of distributed computing nodes, wherein each of said distributed computing nodes defines a different Java address space:

receiving a connection from a user;

granting the user one or more memberships to one or more roles;

invoking an interface with the central database to retrieve a capability-based access policy for each role associated with the user; and applying said capability-based access policy to determine whether to permit the user access to a requested resource of the computing node, wherein said capability-based access policy is distributed, thereby enabling said capability-based access policy to be applied to said distributed computing nodes across multiple Java address spaces.

2. The method of claim 1, wherein the policy sub-tree is a logical child of the authorization root which comprises a policy root, a grantee sub-tree, and a permission sub-tree, and is configured to associate permissions with grantees;

wherein the realm sub-tree is a logical child of the authorization root which identifies the realms defined within a distributed environment served by the authorization tree; and wherein a realm is a unique namespace.

3. The method of claim 1, wherein said capability-based access policies are stored for permanency only in said central database and not on any of the distributed computing nodes.

4. The method of claim 1, further comprising:

caching said retrieved capability-based access policy at the computing node;

wherein said capability-based access policy is stored only on the computing node and said central database.

5. A computer readable storage medium storing instructions that, when executed by a computer, cause the computer to perform a method of administering access to computing resources distributed among multiple address spaces, the method comprising:

maintaining a central database of capability-based access policies, wherein each said capability-based access policy grants a subject one or more access permissions to a resource;

wherein maintaining the central database of capability-based access policies comprises maintaining a logical authorization tree which includes an authorization root, and wherein the logical authorization tree comprises a policy sub-tree and a realm sub-tree; and at each of a plurality of distributed computing nodes, wherein each of said distributed computing nodes defines a different Java address space:

receiving a connection from a user;

granting the user one or more memberships to one or more roles;

invoking an interface with the central database to retrieve a capability-based access policy for each role associated with the user; and applying said capability-based access policy to determine whether to permit the user access to a requested resource of the computing node;

wherein said capability-based access policy is distributed, thereby enabling said capability-based access policy to be applied to said distributed computing nodes across multiple Java address spaces.

6. The computer readable storage medium of claim 5,
wherein said capability-based access policies are stored for permanency only in said central database and not on any of the distributed computing nodes;
wherein the policy sub-tree is a logical child of the authorization root which comprises a policy root, a grantee sub-tree, and a permission sub-tree, and is configured to associate permissions with grantees;
wherein the realm sub-tree is a logical child of the authorization root which identifies the realms defined within a distributed environment served by the authorization tree; and
wherein a realm is a unique namespace.

7. A method of administering access to computing resources distributed among multiple address spaces, comprising:
maintaining a central, directory-based store comprising:
identities of users granted access to computing resources distributed among multiple Java address spaces;
roles in which the users have been granted membership; and
permissions granted to the roles for accessing the computing resources;
wherein maintaining the central, directory-based store involves maintaining a logical authorization tree which includes an authorization root, and wherein the logical authorization tree comprises a policy sub-tree and a realm sub-tree;
receiving queries from computing nodes operating in different address spaces, wherein said each said query comprises an identity of a user; and
in response to each said query, identifying to the computing node one or more roles of which the user is a member;
wherein the central, directory-based store maintains capability-based access policies; and
wherein said capability-based access policy is distributed, thereby enabling said capability-based access policy to be applied to said distributed computing nodes across multiple Java address spaces.

8. The method of claim 7,
wherein the policy sub-tree is a logical child of the authorization root which comprises a policy root, a grantee sub-tree, and a permission sub-tree, and is configured to associate permissions with grantees;
wherein the realm sub-tree is a logical child of the authorization root which identifies the realms defined within a distributed environment served by the authorization tree;
wherein a realm is a unique namespace; and
wherein the method further comprises:
in response to a first query regarding a first user, searching said store for a first set of roles in which the first user is a member; and
searching said store for permissions granted to said each role in said set of roles.

9. The method of claim 8, further comprising:
searching said store for permissions granted to a combination of two or more roles in said set of roles.

10. The method of claim 7, further comprising:
receiving a first update to said store regarding a first user from a first computing node operating in a first address space; and
receiving a second update to said store regarding said first user from a second computing node operating in a second address space.

11. A computer readable storage medium storing instructions that, when executed by a computer, cause the computer to perform a method of administering access to computing resources distributed among multiple address spaces, the method comprising:
maintaining a central, directory-based store comprising:
identities of users granted access to computing resources distributed among multiple Java address spaces;
roles in which the users have been granted membership; and
permissions granted to the roles for accessing the computing resources;
wherein maintaining the central database at capability-based access policies comprises maintaining a logical authorization tree which includes an authorization root, and wherein the logical authorization tree comprises a policy sub-tree and a realm sub-tree;
receiving queries from computing nodes operating in different address spaces, wherein said each said query comprises an identity of a user; and
in response to each said query, identifying to the computing node one or more roles of which the user is a member,
wherein the central, directory-based store maintains capability-based access policies; and
wherein said capability-based access policy is distributed, thereby enabling said capability-based access policy to be applied to said distributed computing nodes across multiple Java address spaces.

12. The computer readable storage medium of claim 11, wherein the method further comprises:
receiving a first update to said store regarding a first user from a first computing node operating in a first address space; and
receiving a second update to said store regarding said first user from a second computing node operating in a second address space;
wherein the policy sub-tree is a logical child of the authorization root which comprises a policy root, a grantee sub-tree, and a permission sub-tree, and is configured to associate permissions with grantees;
wherein the realm sub-tree is a logical child of the authorization root which identifies the realms defined within a distributed environment served by the authorization tree; and
wherein a realm is a unique namespace.

13. A capability-based authorization architecture, comprising:
a central store of capability-based user permission policies;
wherein the central store is configured to maintain a logical authorization tree which includes an authorization root, and wherein the logical authorization tree comprises a policy sub-tree a and a realm sub-tree; and
a plurality of distributed computer nodes across different Java address spaces, wherein each computer node comprises:
communication connections with one or more connected users;
a granting mechanism configured to grant a connected user one or more memberships to one or more roles;
one or more processes executing for the connected users; and
programming logic configured to interface with said database to obtain permission policies for roles associated with each connected user,
wherein said capability-based user permission policy is distributed, thereby enabling said capability-based user permission policy to be applied to said distributed computing nodes across multiple Java address spaces.

14. The capability-based authorization architecture of claim 13, wherein said capability-based user permission policies are configured to be applied across multiple address spaces among the plurality of computer nodes;
   wherein the policy sub-tree logical child of the authorization root which comprises a policy root, grantee sub-tree, and a permission sub-tree, and is configured to associate permissions with grantees;
   wherein the realm sub-tree is a logical child of the authorization root which identifies the realms defined within a distributed environment served by the authorization tree; and
   wherein a realm is a unique namespace.

15. The capability-based authorization architecture of claim 13, wherein each of the computer nodes comprises a separate address space.

16. The capability-based authorization architecture of claim 13, wherein each computer node further includes a Java Virtual Machine defining an address space for the node separate from address spaces of the other computer nodes.

17. The capability-based authorization architecture of claim 13, wherein each said capability-based user permission policy comprises a grant of one or more permissions to one or more users.

18. The capability-based authorization architecture of claim 13, wherein each said capability-based user permission policy comprises a grant of one or more permissions to one or more roles.

19. The capability-based authorization architecture of claim 18, wherein said central store further includes mappings between said roles and users to whom said roles have been assigned.

20. The capability-based authorization architecture of claim 18, wherein each computer node further comprises:
   a cache configured to temporarily store one or more capability-based user permission policies.

21. The capability-based authorization architecture of claim 18, wherein each computer node further comprises:
   an access control context for each user connected to the computer node;
   wherein said access control context identifies one or more roles of which the user is a member.

22. A directory-based store of policies for facilitating access to computer resources distributed among multiple address spaces, the store comprising:
   identities of a plurality of users;
   roles to which the users may be assigned membership; and
   permissions grantable to said roles for authorizing access, by users assigned membership to said roles, to computing resources distributed among multiple Java address spaces;
   wherein said directory-based store of policies are distributed, thereby enabling said directory-based store of policies to be applied to said distributed computing resources across multiple Java address spaces;
   wherein the store is configured to maintaining a logical authorization tree which includes an authorization root; and
   wherein the logical authorization tree comprises a policy sub-tree and a realm sub-tree.

23. The directory-based store of claim 22, further comprising:
   one or more realms, wherein each said realm comprises a separate set of said identities and a separate set of said roles;
   wherein the policy sub-tree is a logical child of the authorization root which comprises a policy root, a grantee sub-tree, and a permission sub-tree, and is configured to associate permissions with grantees;
   wherein the realm sub-tree is a logical child of the authorization root which identifies the realms defined within a distributed environment served by the authorization tree; and
   wherein a realm is a unique namespace.

24. The directory-based store of claim 22, wherein the directory-based store is configured to receive policy updates from multiple computing nodes operating in different address spaces.

25. The directory-based store of claim 22, wherein said permissions are also grantable directly to said users.

* * * * *

UNITED STATES PATENT AND TRADEMARK OFFICE
CERTIFICATE OF CORRECTION

PATENT NO.         : 7,404,203 B2                                          Page 1 of 1
APPLICATION NO.    : 10/430967
DATED              : July 22, 2008
INVENTOR(S)        : Ng It is certified that error appears in the above-identified patent and that said Letters Patent is hereby corrected as shown below:

In column 4, line 67, delete "((RoleX" and insert -- (RoleX --, therefor.

In column 14, line 11, in claim 11, delete "at" and insert -- of --, therefor.

In column 14, line 51, in claim 13, before "and" delete "a".

In column 15, line 5, in claim 14, before "logical" insert -- is a --.

In column 15, line 6, in claim 14, before "grantee" insert -- a --.

In column 16, line 16, in claim 22, delete "maintaining" and insert -- maintain --, therefor.

Signed and Sealed this

Twenty-second Day of December, 2009

David J. Kappos
*Director of the United States Patent and Trademark Office*